Aug. 13, 1963
J. W. DE POY
3,100,616
WIRE CLOTH
Filed May 12, 1959
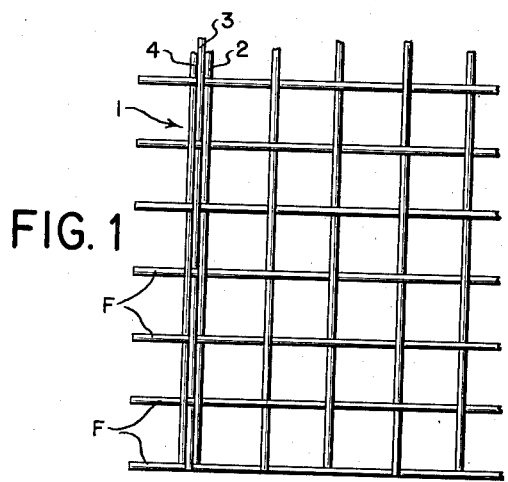
FIG. 1
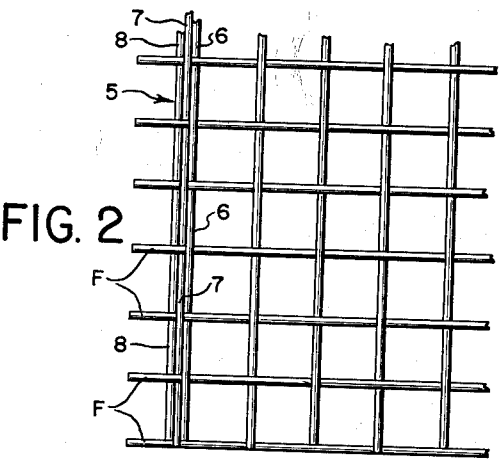
FIG. 2
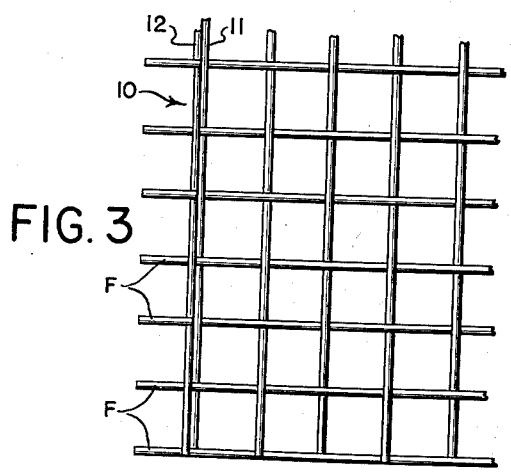
FIG. 3
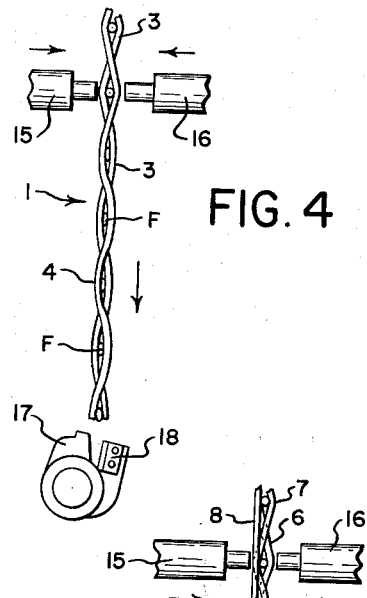
FIG. 4
FIG. 5
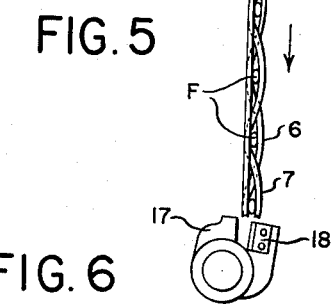
FIG. 6
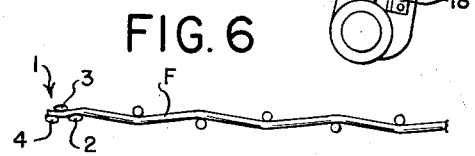
FIG. 7
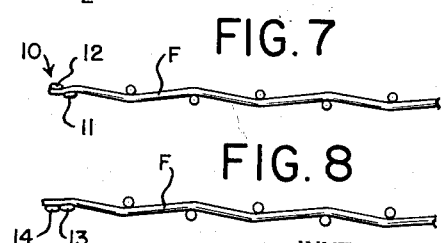
FIG. 8
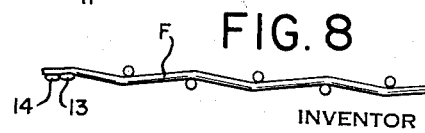
INVENTOR
J. William De Poy
BY Pennie, Edmonds,
Morton, Barrows & Taylor
ATTORNEYS

United States Patent Office 3,100,616
Patented Aug. 13, 1963

3,100,616
WIRE CLOTH
James William De Poy, Oakland, Calif., assignor to The Colorado Fuel and Iron Corporation, Denver, Colo., a corporation of Colorado
Filed May 12, 1959, Ser. No. 812,759
1 Claim. (Cl. 245—10)

This invention relates to woven wire products of the type known as wire cloth, for example "hardware cloth," and has for its object the provision of an improved selvage on such cloth which not only eliminates the objectionable raw edges on the cloth heretofore produced on bobbinless looms, but gives advantages in production of the cloth. The wire cloth having the selvage of the invention is not only advantageously produced on bobbinless looms, giving improvements in production, but the selvage improves the product.

The invention is applicable to wire cloth of the type known as "hardware cloth," whether formed before or after galvanizing, or of black wire, and to wire cloth having either smaller or larger meshes, and formed of either smaller or larger wire than is usually used in hardware cloth.

In accordance with the invention, two or more warp wires are arranged very close together and overlie the fill wires at the outer edge of the cloth where a selvage is desired. The wires thus arranged and the fill wires are heated electrically while under pressure to fuse the wires together and squeeze them into a flattened configuration. This may be done effectively by passing the warp wires under a welding head that applies the necessary current and pressure to fuse, soften and flatten the warp wires and the fill wires at the points of intersection. Preferably, as a part of the welding operation, the welded selvage portion is passed through a shearing operation to cut the fill wires off close to the outermost warp wire of the selvage, thus presenting a smooth, flat, ribbon-like selvage which has considerable inherent strength, and which has acceptable appearance.

These and other novel features of the invention will be better understood after considering the following discussion taken in conjunction with the accompanying drawings in which:

FIGS. 1, 2 and 3 are plan views of three modifications of wire cloth showing selvages of the invention in intermediate stages of production;

FIGS. 4 and 5 illustrate the welding and pressing of the selvages of FIGS. 1, 3 and 2, respectively;

FIGS. 6 and 7 are sectional views of the welded, pressed and trimmed selvages of FIGS. 1, 2 and 3, respectively; and FIG. 8 is a sectional view of another form of selvage.

The section of wire cloth shown in FIG. 1 has a selvage 1 formed of three interwoven warp wires 2, 3 and 4, in a regular weave. The fill wires F extend beyond the selvage a short distance and are the parts to be sheared off. In FIG. 2 a similar selvage 5 is shown formed of the three wires 6, 7 and 8 except that the outer wire 8 is entirely under the fill wires F. The section of wire cloth shown in FIG. 3 is similar to that of FIGS. 1 and 2 with the exception that the selvage 10 consists of two wires 11 and 12 interwoven with the fill wires F.

FIG. 8 is a sectional view of a wire product consisting of fill wires F and warp wires 13 and 14. In this form of product both warp wires are arranged on one side of the fill wires and are not interwoven with the fill wires. The selvage may also be formed of, say, one or three of such arranged warp wires.

FIGS. 4 and 5 illustrate diagrammatically an arrangement of apparatus for carrying out a process of the invention in forming the improved wire product. The operation will be described with reference to the welding and pressing of the selvage of FIG. 1 which operation is applicable to the welding of all the selvages of the invention. The selvage of the cloth is passed between the electrodes 15 and 16 of a conventional electric welding apparatus modified to apply a sufficient pressure to flatten the weld used as shown in FIGS. 6, 7 and 8. This may be done by having member 15 stationary and member 16 reciprocal to apply the required pressure while the welding current is heating the wires to a plastic state. This may also be done by passing the selvage between rolls that serve as pressure applying electrodes.

The wire cloth is passed in the direction of the arrow and after the aforementioned operation has been completed, the selvage is passed between the jaws 17 and 18 of a shearing device to shear off the projecting ends of the fill wires F which extend to the left (as viewed in FIGS. 1, 2 and 3) from the respective outside selvage wires 4, 8 and 12. The result is a very smooth, flat ribbon-like selvage in each modification.

It is common practice to galvanize hardware cloth and the improved product of the invention may also be galvanized. After galvanizing, the selvages present a very neat and smooth appearance. Due to the flattening, they do not build up on the edges, and therefore do not cause trouble in the loom.

I claim:
An improved wire cloth formed of round warp wires and round fill wires which comprises a selvage formed of three warp wires and the fill wires, the two innermost warp wires being interwoven with the fill wires and the outer warp wire being under the fill wires, said warp wires which form the selvage being welded to the fill wires and the warp wires and fill wires being flattened at the points where the wires are welded together, said fill wires being sheared off at the edge of the outside selvage warp wire.

References Cited in the file of this patent
UNITED STATES PATENTS

| | | |
|---|---|---|
| 274,611 | Johnstone | Mar. 27, 1883 |
| 1,071,822 | Storey | Sept. 2, 1913 |
| 1,783,948 | Sommer | Dec. 2, 1930 |
| 1,920,495 | Brown et al. | Aug. 1, 1933 |
| 1,927,498 | Lindsay et al. | Sept. 19, 1933 |
| 1,995,822 | Sargent | Mar. 26, 1935 |
| 2,257,993 | Young | Oct. 7, 1941 |
| 2,368,047 | Southwick | Jan. 23, 1945 |
| 2,533,439 | Elder | Dec. 12, 1950 |
| 2,694,852 | Rogers | Nov. 23, 1954 |
| 2,740,601 | Knapp | Apr. 3, 1956 |
| 2,922,442 | Webber | Jan. 26, 1960 |